Jan. 24, 1967 W. A. LANKFORD 3,300,599
LINE TENSION CIRCUIT INTERRUPTER
Filed Dec. 18, 1964 6 Sheets-Sheet 1
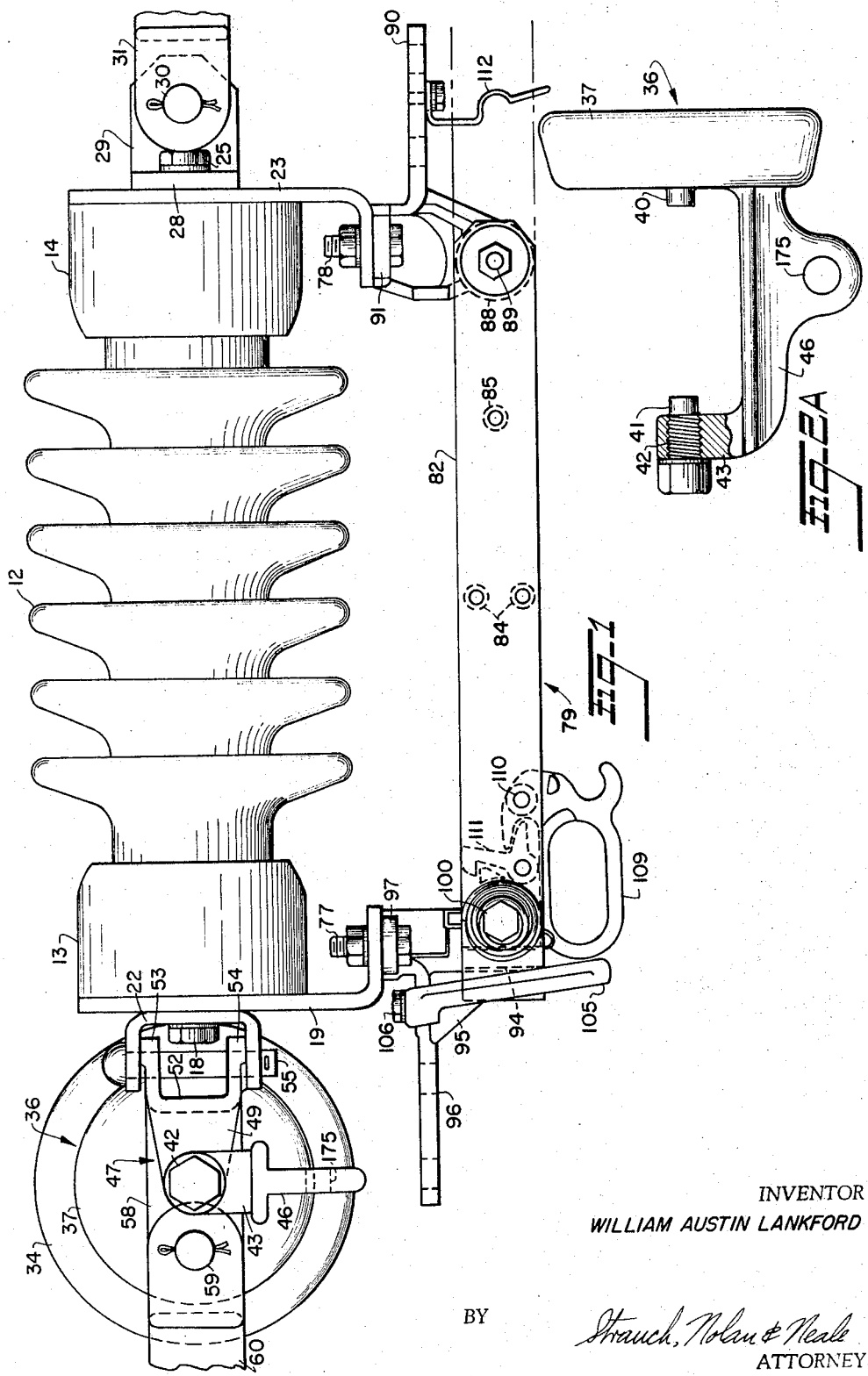
INVENTOR
WILLIAM AUSTIN LANKFORD
BY Strauch, Nolan & Neale
ATTORNEYS

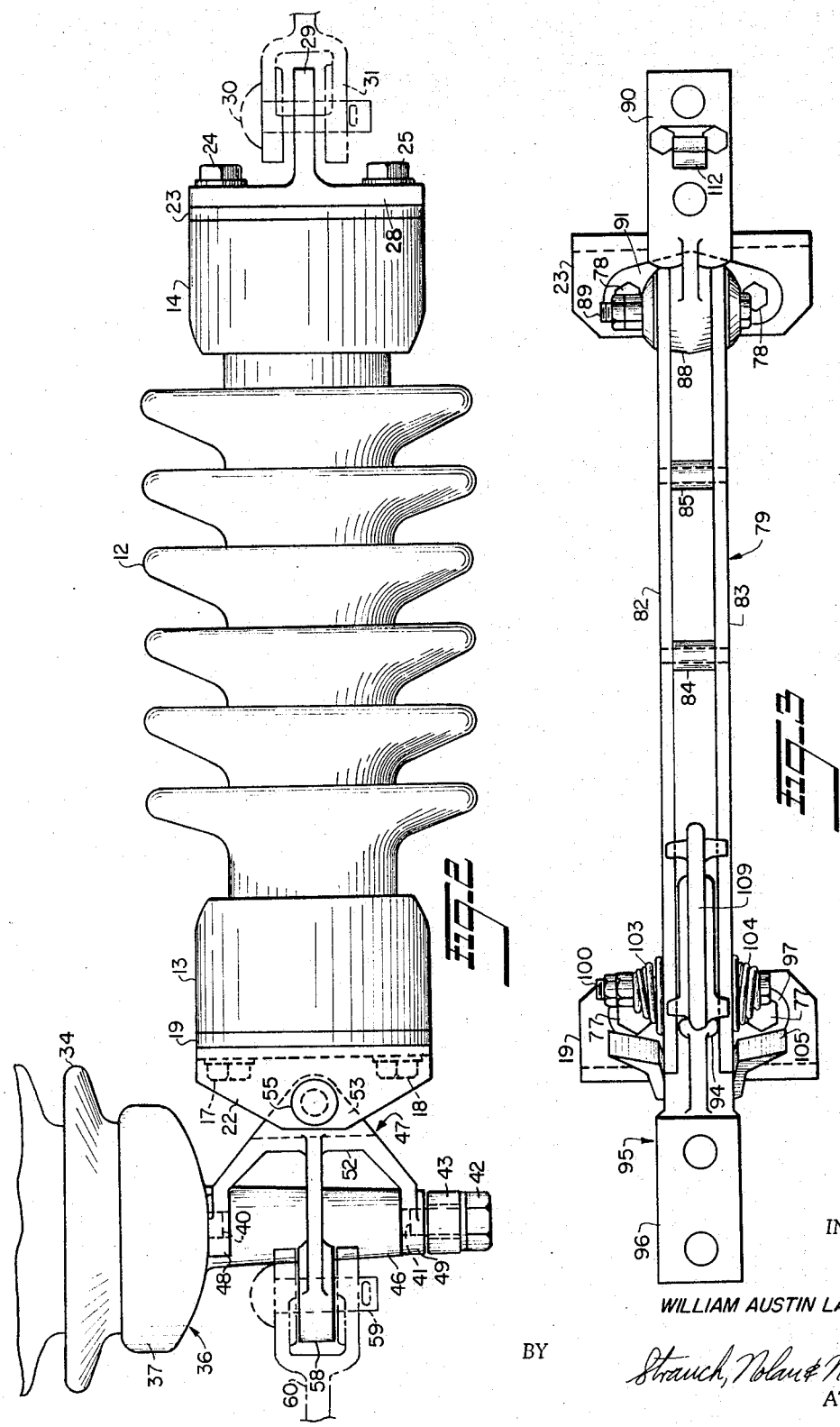

Jan. 24, 1967  W. A. LANKFORD  3,300,599
LINE TENSION CIRCUIT INTERRUPTER
Filed Dec. 18, 1964  6 Sheets-Sheet 3
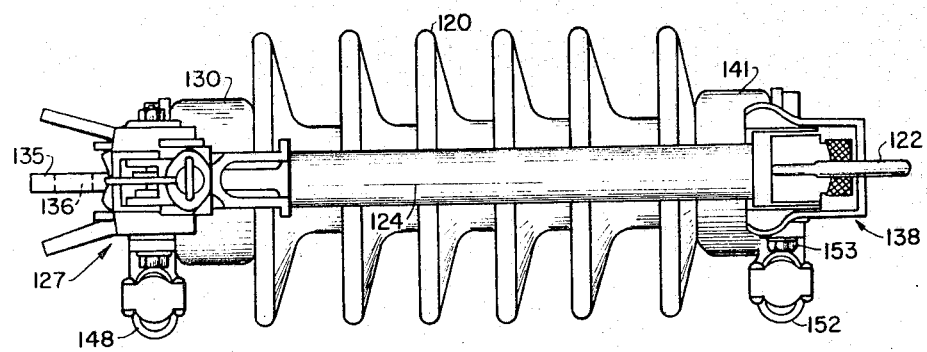
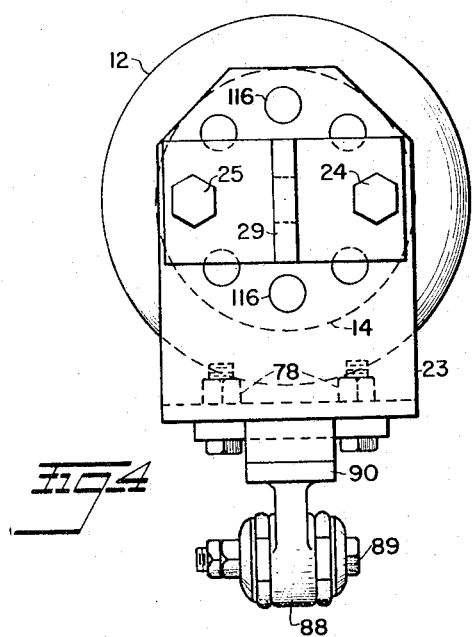
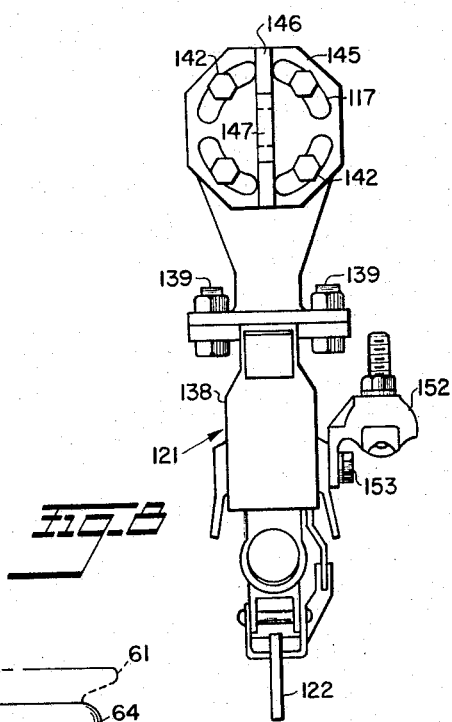
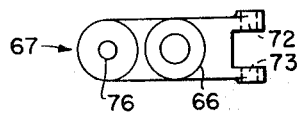
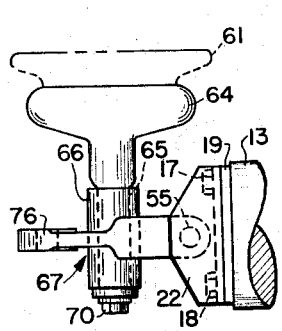
INVENTOR
WILLIAM AUSTIN LANKFORD
BY
Strauch, Nolan & Neale
ATTORNEYS Jan. 24, 1967  W. A. LANKFORD  3,300,599
LINE TENSION CIRCUIT INTERRUPTER
Filed Dec. 18, 1964  6 Sheets-Sheet 4

INVENTOR
WILLIAM AUSTIN LANKFORD

BY  *Strauch, Nolan & Neale*
ATTORNEYS

INVENTOR
WILLIAM AUSTIN LANKFORD

BY

ATTORNEYS

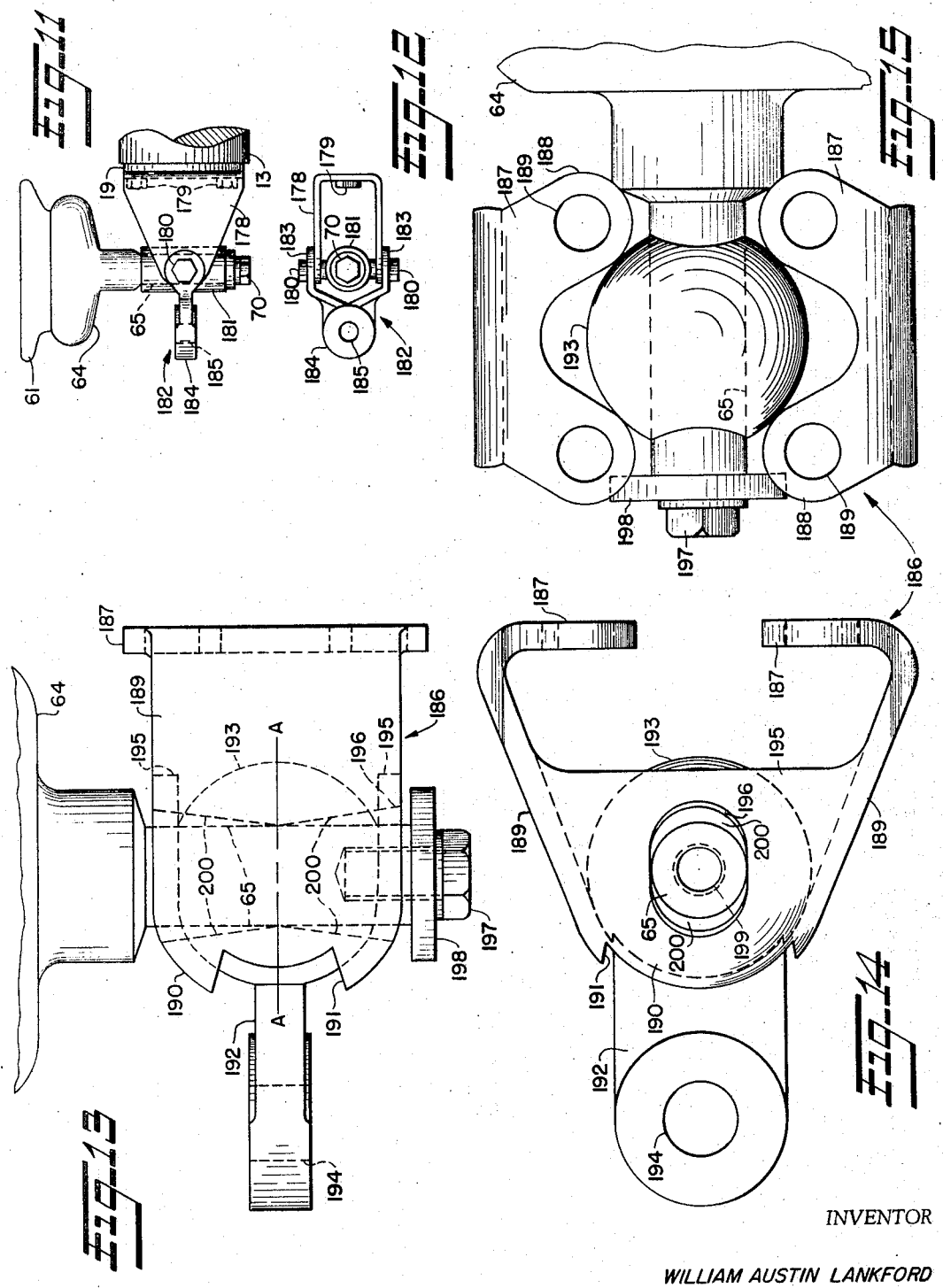

United States Patent Office
3,300,599
Patented Jan. 24, 1967

3,300,599
LINE TENSION CIRCUIT INTERRUPTER
William Austin Lankford, Birmingham, Ala., assignor to USCO Power Equipment Corporation, Birmingham, Ala., a corporation of Alabama
Filed Dec. 18, 1964, Ser. No. 419,339
12 Claims. (Cl. 200—48)

This invention relates to high voltage disconnect switches or circuit interrupters of the type wherein a strain insulator mounted directly in the high tension line carries both the fixed and movable elements of the circuit interrupter. While such mounting of interrupters directly in the line is not broadly new as shown by the U.S. Patent No. 1,821,167 and the Swedish Patent No. 80,825 of July 3, 1934, the interrupters are not held against rotation about the axis of the line and there is nothing to prevent them from twisting and turning about that axis except the stiffness of the line itself. This stiffness is not sufficient to prevent the turning of the interrupter under all conditions, as when there is an accumulation of ice, or there are high winds, etc.

In accordance with my invention one end of the strain insulator that carries the circuit interrupter is attached to and carried by a line insulator on a pole or cross-arm in such manner that the line insulator not only performs its normal function of supporting and insulating the line, but also supports the strain insulator and interrupter and prevents their rotation about the axis of the line. Due to the manner in which the strain insulator and interrupter are mounted, the interrupter can be operated even if the span of line is down. The invention is applicable to circuit interrupters generally and is shown as applied to manually operated hook stick or fused disconnect switches.

Accordingly, it is a primary object of the invention to provide a novel mounting for a circuit interrupter carried by a strain insulator of a high voltage line.

Another important object of the invention is to provide a mounting for a circuit interrupter carried by a high voltage line strain insulator that prevents the circuit interrupter from rotating about the axis of the high voltage line.

It is still another object of the invention to provide a mounting for a high voltage line strain insulator carrying a circuit interrupter so that the circuit interrupter can be positioned and held in any position around the axis of the line.

Another object is the provision of a mounting for a strain insulator and circuit interrupter carried thereby that will permit operation of the circuit interrupter even if the line connected to the strain insulator is down.

Other objects will become apparent as the description proceeds in connection with the accompanying drawings, wherein:

FIGURE 1 is a view in side elevation of a strain insulator supporting a manually operated disconnect switch and attached to a clamp top on a horizontally extending line post insulator.

FIGURE 2 is a top plan view of the structure shown in FIGURE 1.

FIGURE 2A is a view in side elevation, partly in section, of a clamp on the outer end of the line insulator of FIGURES 1 and 2.

FIGURE 3 is a bottom view of the disconnect switch alone, of FIGURE 1.

FIGURE 4 is an end view of a switch mounting bracket, as viewed from the right of FIGURE 1.

FIGURE 5 is a top plan view similar to the left hand end of FIGURE 2 but showing an alternate form of mounting of the strain insulator on the line insulator.

FIGURE 5A is a view in side elevation of the yoke of FIGURE 5.

FIGURE 7 is a bottom plan view of FIGURE 6.

FIGURE 8 is a view from the right of FIGURE 6.

FIGURES 11 and 12 are top plan and side elevation views of another form of mounting the strain insulator on the line insulator.

FIGURES 13, 14 and 15 are top plan, side elevation and end elevation views of still another form of mounting the strain insulator on the line insulator.

Figure 6:
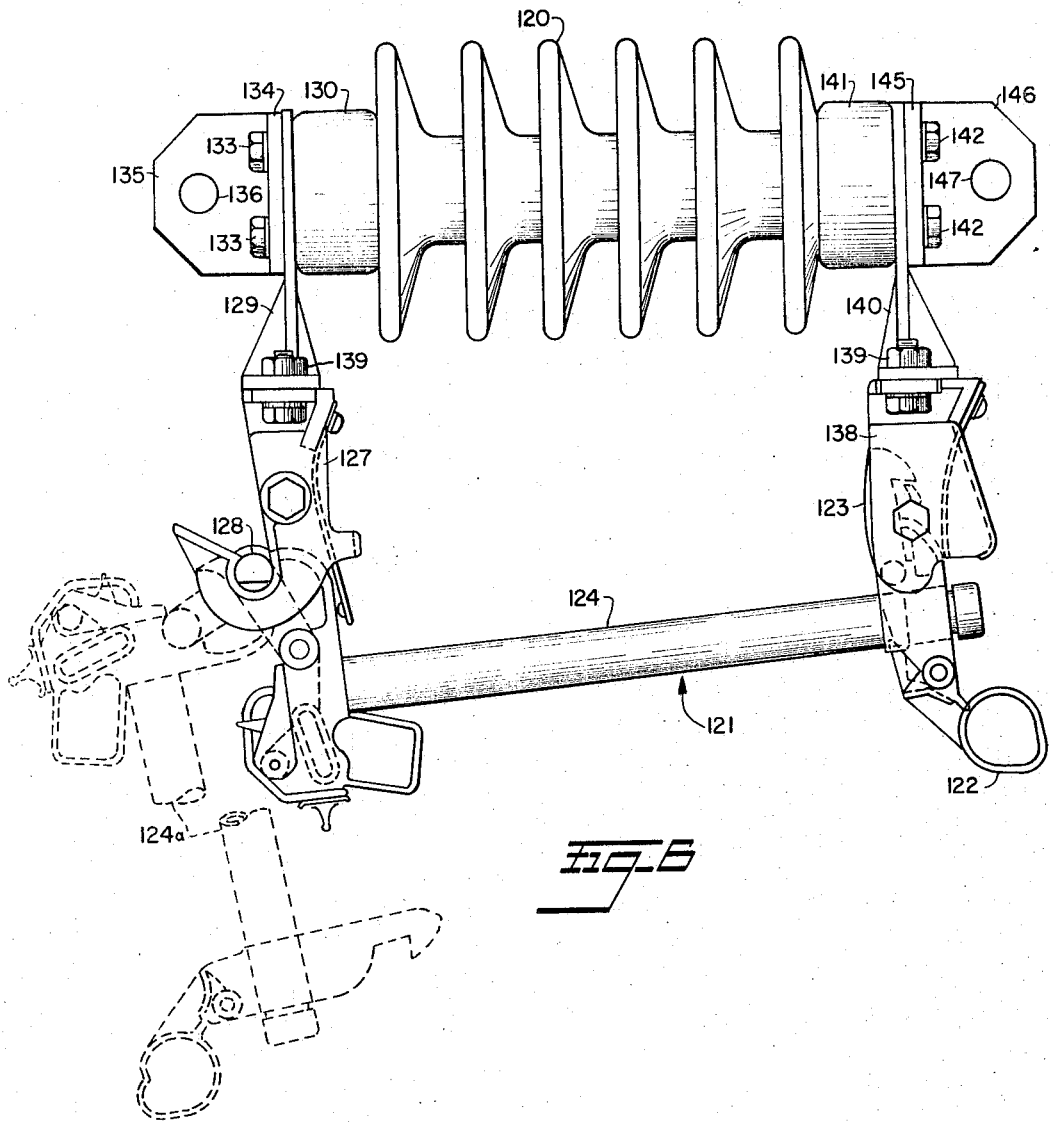
FIGURE 6 is a view in side elevation of a fused disconnect switch mounted on a strain insulator.

Referring to FIGURES 1 and 2, a strain or tension type of high voltage insulator is shown at 12. Its end cap 13 is provided with diametrically spaced tapped holes to receive a pair of cap screws 17 and 18 which secure an angular switch mounting bracket 19 and a U-shaped bracket 22 to the face of the end cap. The other end cap 14 has a similar angular mounting bracket 23 secured thereto by a pair of cap screws 24 and 25. These cap screws 24 and 25 also secure a T-shaped bracket 28 the central leg 29 of which is bored to receive a pin 30 which also passes through the bifurcated end of a strain clamp 31 for the line (not shown).

Figure 9:
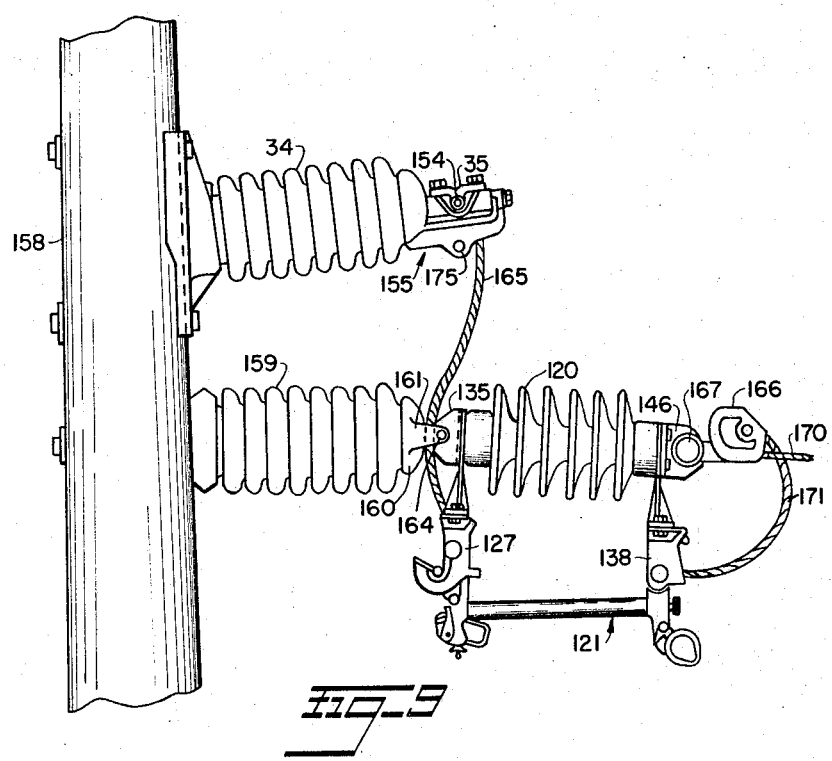
FIGURE 9 is a view in side elevation of an application of the invention at a line tap junction.

At the left ends of FIGURES 1 and 2 is shown a portion of a clamp top line insulator 34 similar to the insulator 34 of FIGURE 9, except that instead of mounting a clamp for the line on its outer end, such as the clamp 35 of FIGURE 9, a structure for supporting one end of the strain insulator 12 is substituted. The clamp top itself, which is secured to and carried by the outer end of the line insulator 34, is metallic, and shown in FIGURE 2A, being designated generally by the reference number 36. It comprises a disc shaped cap 37 having a centrally protruding fixed pintle 40 which faces a coaxial pintle 41 on a pintle bolt 42 threaded through an upstanding leg 43 on a horizontal arm 46 which is integral with the cap 37 and protrudes therefrom as shown in FIGURE 2A.

A yoke 47 (FIGURE 2) has a pair of spaced arms 48 and 49 journalled on the pintles 40 and 41 respectively. The arms 48 and 49 extend to the right as viewed in FIGURE 2, terminating at a wall 52. To the right of the wall 52 the yoke has another pair of spaced arms 53 and 54, best seen in FIGURE 1, which are at right angles to arms 48 and 49 and extend to between the spaced legs of the U-shaped bracket 22, to which they are pivotally secured by a pin 55. Midway between the yoke legs 48 and 49 which are journalled on the pintles 40 and 41 there extends from the wall 52 a central leg 58 to which is secured by a pin 59 the bifurcated end of a line strain clamp 60. The pin 59 is a substantial distance to the left of the pintles 40 and 41. Thus the clamp top line insulator 34 supports the line attached to the strain clamp 60, the strain insulator 12 and the line attached to the right hand strain clamp 31.

FIGURES 5 and 5A show an alternate form of clamp top line insulator 61 wherein the cap 64 has an axially extending integral stud 65 upon which is journalled the cylindrical sleeve 66 of a yoke indicated generally at 67. The yoke is secured on the stud 65 as by a cap screw 70 threaded into the outer end of the stud 65. The bore in the sleeve 66 that receives the stud 65 is indicated at 71 in FIGURE 5A. At its bifurcated right end the yoke has holes 72 and 73 to receive the pin 55 which secures it to the U-shaped bracket 22 and at its other end it has a hole 76 to receive a pin 59 by which a strain clamp similar to the clamp 60 of FIGURE 2 is secured to the yoke. Thus as in the embodiment of FIGURES 1 and 2 the strain insulator is kept from rotating about the axis of the high voltage line. As is apparent, the yoke 47 of FIGURES 1 and 2 could be mounted upon the stud 65 of FIGURE 5 if its central leg were bored for the passage of the bolt. In such case the central leg 58 would be thickened to make up for the loss in strength due to the bore, since the central leg supports the full load of the line that is attached to the line strain clamp 60.

FIGURE 1 shows a single pole disconnect switch 79 of the type generally referred to as a hookstick switch secured to the angular mounting brackets 19 and 23 on the ends of the strain insulator 12 by pairs of bolts 77 and 78. The details of construction of the switch are not important to an understanding of the invention and reference may be had to U.S. Patent Nos. 2,803,726 and 2,803,727 for a full description of two switches of this type.

Referring to FIGURES 1 and 2 the switch 79 comprises a pair of parallel switch blades 82 and 83 maintained separated as by separators 84 and 85 and by a fixed hinge member 88 to which they are pivotally attached by a hinge pin 89. The fixed hinge member 88 is integral with a line terminal connector 90 and a base 91 through which pass the bolts 78 to secure the fixed hinge member and the switch blades carried thereby to the bracket 23 on the strain insulator 12.

The fixed contact 94 of the disconnect switch is an integral part of a member 95 which includes a line terminal connector 96 and a base 97 through which pass the bolts 77 that secure the entire member 95 to the bracket 19 on the strain insulator 12. As seen in FIGURE 3 the free ends of the switch blades 82 and 83 remote from the hinge pin 89 are biased toward each other by a compression assembly comprising a bolt 100 passing through both blades and compression springs 103 and 104 so that the blades 82 and 83 are pressed against the fixed contact 94 in a manner well-known in the art. A generally V-shaped guide member 105 is mounted on member 95, with its open end downward, by a screw 106, and serves to guide the switch blades into engagement with the fixed contact 94 during a switch closing movement of the blades.

A ring 109 is pivotally mounted between the switch blades by a pin 110 and is engageable by a conventional hookstick for opening and closing the disconnect switch, and also actuates a latch indicated at 111 in FIGURE 1 which latches the switch against accidental opening. The latch is disengaged when the ring is pulled downward, in a manner well-known in the art. A blade stop and retainer 112 of spring material is secured to the bottom of the line terminal connector by screws 115 and serves to stop opening the switch blades more than 180 degrees and also to resiliently hold them in that position.

In FIGURES 1 to 3 the disconnect switch 79 is shown mounted vertically below the strain insulator 12. However this is not always the most convenient operating position. Because of the mounting of the strain insulator so that it does not rotate about its axis or that of the high voltage line it is possible to mount the disconnect switch in other positions such as horizontal or 45 degree etc. positions.

Referring to FIGURE 4 the angular mounting bracket 23 is shown to have four sets of diametrically arranged holes 116 so that the bracket may be mounted in any of eight positions about the axis of the strain insulator 12 by removing the cap screws 24 and 25 and then reinserting them after the bracket 23 is placed in the selected position against the insulator end cap 14. The other bracket 19 is provided with similar sets of diametrically spaced holes as will be understood. A wider selection of positions is attainable by making the holes in the form of arcuate slots as shown at 117 in FIGURE 8. Also, the position of the disconnect switch may be reversed if it is desired to have the hinged end adjacent the line insulator 34. The strain insulator and switch may be to the left of the line insulator if desired, in which case the pin 59 and protruding end of the central leg 58 of the yoke 47 would be to the right of the axis of the line insulator 34 as viewed in FIGURES 1 and 2.

Because of the free swiveling pivotal attachment of the strain insulator 12 to the pintles of FIGURES 1 to 3 or the stud 65 of FIGURE 5 the axis of the strain insulator will be coaxial with that of the line irrespective of the sag of the line. The swivel connection at the pin 55 permits swaying of the strain insulator with the line during high winds or the like. If that section of the line to the right of the line insulator 34 in FIGURES 1 and 2, and which includes the strain insulator and switch, should be down because of a break or the like, the switch will remain operative for the purpose of cutting off the downed line if desired. It would be operative even if the strain insulator 12 should sag to a vertical position, but it will not sag to such an extent if the line connected to the left line strain clamp 60 is not down. This is because of the fact that the pin 59 through the central leg 58 of the yoke 47 is a substantial distance to the left of the axis of the pintles 40 and 41 upon which the yoke is journalled. As shown in FIGURE 1 this distance is a little distance shorter than the distance from pintles 40–41 to the pin 55, but the distance may be as large as desired. The mechanical tension in the left line will thus tend to reduce rotation of the yoke 47 and the insulator about the axis of the pintles.

FIGURES 6, 7 and 8 show a strain insulator 120 similar to the strain insulator 12 of FIGURES 1 and 2 but supporting instead a fused disconnect switch indicated generally at 121 of well known type which may be opened either by engaging a hookstick in the pivoted ring 122 to disengage a latch 123, or which will automatically open when an overload occurs that will melt a fuse in fuse tube 124 and unlatch the switch so that the fuse tube drops to the open position indicated at 124a. The fuse tube 124 is of a dielectric material for the expulsion of the arc that occurs therein when the fuse wire passing through it melts under overload, and is suitably vented. The fuse tube is hinged to a fixed support 127 by a pin 128. Support 127 is secured to a bracket 129 by a pair of bolts 139 and the bracket 129 is secured to an end cap 130 on the insulator 120 by four bolts 133 which are threaded into the end cap and which also pass through the vertical wall 134 of a T-shaped connector bracket, the leg 135 of which has a hole 136 therethrough.

The other fixed support 138 that carries the latch 123 is secured by bolts 139 to a bracket 140 similar to bracket 129 and which is attached to an end cap 141 of the insulator by four bolts 142 which pass through the vertical wall 145 of a T-shaped bracket having a central leg 146 with a hole 147 through it. FIGURE 7 shows a clamp 148 for a power line terminal secured to support 127 by a bolt 149 and a similar clamp 162 secured to support 138 by bolt 153 is also shown in FIGURE 8.

For proper functioning of the fuse tube 124, and for removing, replacing and closing of the cut-out fuse therein the switch 121 should hang directly under the strain insulator as shown in FIGURE 8. To assure such alignment the vertical walls 145 and 134 of the T-shaped connector brackets have arcuate slots for the bolts 142, as shown in FIGURE 8 at 117.

The fused disconnect switch of FIGURES 6, 7 and 8 could obviously have end fittings on the strain insulator similar to those shown in FIGURES 1 to 5A instead of the T-shaped connector brackets. The latter have been shown however in view of the applications shown in FIGURES 9 and 10 where the fused disconnect or cut-out switches 121 are used at tap line junctions.

Referring to FIGURE 9 a main line conductor 154 (perpendicular to the plane of the drawing) is shown clamped by the clamp 35 on a clamp top 155 similar to that shown at 36 in FIGURE 2A except that the line clamp 35 is mounted on the pintles 40 and 41. The clamp top line insulator 34 is shown attached to a pole 158. Below the insulator 34 is a similar insulator 159 which has a top 160 having a pair of spaced parallel legs 161 between which is secured the leg 135 of the connecting bracket by a pin 164. A conductor 165 extends from the main line conductor to the clamp 148 (FIGURE 7) on support 127. A line strain clamp 166 is connected by a pin 167 to the connector bracket leg 146 and a top line conductor 170 is secured to the strain clamp, with its end 171 connected to the clamp 152 (FIGURE 8) on the support 138.

Figure 10:
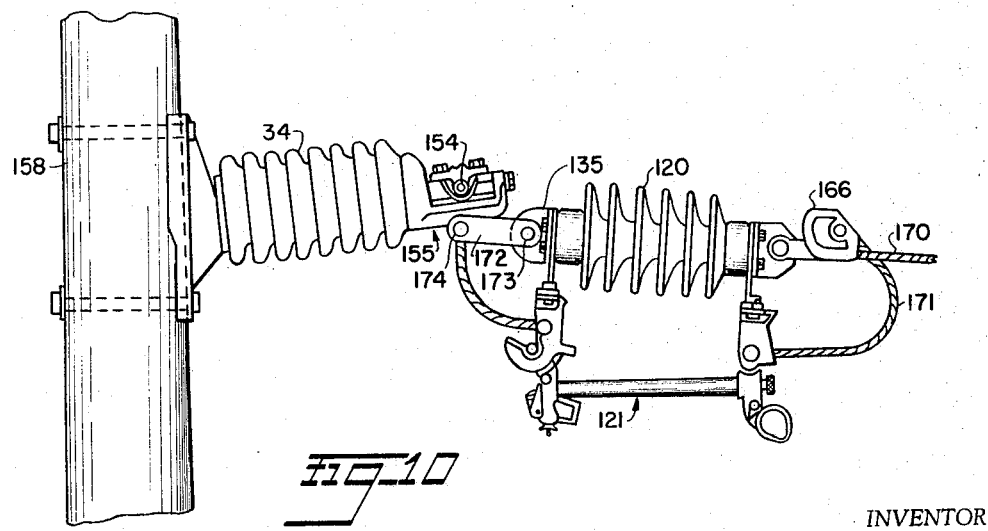
FIGURE 10 is a view in side elevation of another application at a line tap junction.

FIGURE 10 shows another arrangement at a tap line junction. In this instance the insulator 159 of FIGURE 9 is eliminated and the strain insulator 120 is connected directly to the clamp top 155 of the main line conductor 154 by a pair of spaced parallel links 172 that are secured to the connector bracket leg 135 by a pin 173 and to the clamp top 155 by a pin 174 which passes through a hole 175 (FIGURES 2A and 9) in the horizontal arm of the clamp top 155. The fused disconnect switch 121 of FIGURES 9 and 10 will not rotate about the axis of the tap line conductor. It can be mounted opposite hand if desired, and as is apparent, a hookstick disconnect switch such as shown in FIGURE 1 could be mounted on the strain line insulator 120 of FIGURES 9 and 10 instead of the fused disconnect switch.

FIGURES 11 and 12 illustrate another form of connection between a strain insulator (not shown) having an end cap 13 and a line post insulator 61 having a cap 64 and integral stud 65 similar to that of FIGURE 5. In FIGURES 11 and 12 a U shaped bracket 178 is secured to the end cap 13 of the strain insulator by a pair of bolts 179 which also pass through an angular mounting bracket for the circuit interrupter. The bifurcated end of the bracket 178 is journalled upon a pair of studs or bolts 180 which are threaded into a cylindrical sleeve 181 journalled on the stud 65 on the line post cap 64. The sleeve 181 is secured on the stud 65 by a nut or cap screw 70. Also journalled on the bolts 180 is a yoke 182 having a pair of spaced legs 183 and central leg 184 having a hole 185 by which a line strain clamp, not shown, is connected to the yoke. The embodiment allows a horizontal pivotal movement of the yoke 184 about the pivots 180, which is not permitted in the embodiment of FIGURES 5 and 5A where the yoke 67 is integral with the sleeve 66.

A still further form of connection that does not permit rotation of the strain insulator about its longitudinal axis, but does permit rotation about horizontal and vertical axes is shown in FIGURES 13, 14 and 15. As in FIGURES 11 and 12 the cap on the line post insulator has an integral stud 65 which extends substantially horizontally. A bracket designated generally by reference number 186 has a pair of spaced coplanar flanges 187 spaced from each other, each flange having a pair of ears 188 with holes 189 therethrough for the passage of cap screws, not shown, for the mounting of the bracket on the end of a strain insulator, not shown. The bracket includes converging top and bottom walls 189 that terminate opposite the flanges 187 in a semi-spherical end wall 190 having a rectangular opening 191 therethrough for the passage of a tongue 192 that protrudes from and is integral with a ball 193 that mates with and is seated within and against the semi-spherical end wall 190. The tongue 192 has an opening 194 for reception of a pin by which a line strain clamp is secured to the tongue.

The bracket 186 includes parallel side walls 195 connecting the converging top and bottom walls 189. Each side wall has an opening 196 therethrough for the passage of the stud 65 upon which the bracket 186 is pivoted. Each opening 196 has a width from top to bottom equal to the diameter of the stud 65 but is elongated horizontally, as best seen in FIGURE 14, to permit limited rocking of the bracket 186 about the stud 65 in a horizontal plane as well as rocking in a vertical plane about the stud 65. In FIGURE 14 the securing cap screw 197 and washer 198 are not shown, to expose and better show the opening 196, only the tapped hole 199 for the cap screw 197 being shown.

The hole 200 through the ball 193 for the passage of stud 65 is not circular except in the vertical plane indicated by the line A—A in FIGURE 13, at which plane it is circular. From the plane A—A outward to the surface of the ball the hole 200 is of uniform height as are the slotted openings 196 in the bracket side walls 195, but its side walls flare or are inclined outwardly as shown by the four dotted lines 200 of FIGURE 13. This permits a rocking movement of the tongue 192 in a horizontal plane about the stud 65.

Thus the two embodiments shown in FIGURES 11 to 15 each prevent rotation about its axis of the strain insulator that carries the circuit interrupter but permits rocking of the strain insulator about vertical and horizontal axes. The yoke 182 of FIGURES 11 and 12 and the tongue 192 of FIGURES 13 and 14 to which the strain clamps are connected are also permitted a rocking movement in both vertical and horizontal planes, thus eliminating any bending loading upon them or the strain clamp as the line supported by the strain clamp due to wind or other forces.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A circuit interrupter comprising:
   (a) a strain insulator;
   (b) a line insulator;
   (c) means on a first end of said strain insulator for connecting said first end of said strain insulator to a conductor line;
   (d) pivotal means on the other end of said strain insulator connecting said other end to said line insulator for rotation of said strain insulator solely in a vertical plane;
   (e) means on said other end of said strain insulator for connecting said other end of said strain insulator to a conductor line;
   (f) and a circiut interrupting device fixedly attached to the ends of said strain insulator and including means for connecting it to the ends of the conductor line.

2. The circuit interrupter of claim 1 wherein:
   (a) said pivotal means on the other end of said strain insulator for connecting said other end to said line insulator for rotation solely in a vertical plane is pivotally connected to said strain insulator to also permit rotation of said strain insulator solely in a substantially horizontal plane.

3. The circuit interrupter of claim 1 wherein:
   (a) said strain insulator and said means on said other end of said strain insulator for connecting said other end of said strain insulator to a conductor line are on opposite sides of said pivotal means on the other end of said strain insulator for connecting said other end to said line insulator for rotation solely in a vertical plane.

4. The circuit interrupter of claim 1 wherein:
   (a) said means on said other end of said strain insulator for connecting said other end of said strain insulator to a conductor line is linearly spaced by a substantial distance and angularly spaced by 180 degrees on the other side of said pivotal means for said strain insulator.

5. The circuit interrupter of claim 1 including:
(a) means for attaching said circuit interrupting device to said strain insulator in a plurality of angular positions about the axis of said strain insulator.

6. A circuit interrupter comprising:
(a) a strain insulator;
(b) first means on a first end of said strain insulator for connecting said first end of said strain insulator to a conductor line;
(c) second means for connecting the second end of said strain insulator to a conductor line;
(d) said second means including horizontal pivot means fixed against rotation about the axis of the conducting line adapting the said second end of said strain insulator to be connected to a line insulator for rotation solely in a vertical plane;
(e) and a circuit interrupting device fixedly attached to the ends of said strain insulator and including means for connecting it to the ends of the conductor line.

7. The circuit interrupter of claim 6:
(a) wherein said second means is also pivotally connected to said strain insulator to permit rotation of said strain insulator solely in a substantially horizontal plane.

8. The circuit interrupter of claim 6:
(a) wherein said second means for connecting the second end of said strain insulator to a conductor line and said strain insulator are on opposite sides of said pivotal means for connecting the second end of said strain insulator to a line insulator.

9. The circuit interrupter of claim 6 including:
(a) means for attaching said circuit interrupting means to said strain insulator in a plurality of angular positions about the axis of said strain insulator.

10. A circuit interrupter comprising:
(a) a strain insulator;
(b) first means on a first end of said strain insulator for connecting said first end of said strain insulator to a conductor line;
(c) second means on the second end of said strain insulator for connecting said second end of said strain insulator to a conductor line;
(d) horizontal pivot means on said second end of said strain insulator fixed against rotation about the axis of the conductor line adapting said second end of said strain insulator to be connected to a line insulator for rotation solely in a vertical plane;
(e) and a circuit interrupting device fixedly attached to the ends of said strain insulator and including means for connecting it to the ends of the conductor line.

11. The circuit interrupter of claim 7:
(a) wherein said pivotal means included in said second means comprises connecting means having a hole therethrough for mounting upon a fixed horizontal pivot;
(b) said connecting means including a bracket and a pivotal connection between said bracket and connecting means; and
(c) said pivotal connection being coplanar with the hole in said connecting means.

12. The circuit interrupter of claim 11:
(a) wherein said second means for connecting the second end of said strain insulator to a conductor line comprises a ball having a tongue protruding therefrom; and
(b) said bracket includes a spherical seat for said ball, there being an opening through said seat for the passage of said tongue.

References Cited by the Examiner
FOREIGN PATENTS 80,825   7/1934   Switzerland.

ROBERT K. SCHAEFER, *Primary Examiner.*

H. H. HAUSER, *Assistant Examiner.*